Aug. 17, 1954  J. CSAKI  2,686,682
AUTOMATIC GRIPPING MEANS FOR MACHINE TOOLS AND THE LIKE
Filed July 8, 1952

INVENTOR:
JOACHIM CSAKI
BY:

Patented Aug. 17, 1954

2,686,682

UNITED STATES PATENT OFFICE 2,686,682

AUTOMATIC GRIPPING MEANS FOR MACHINE TOOLS AND THE LIKE

Joachim Csaki, Stuttgart, Germany

Application July 8, 1952, Serial No. 297,695

14 Claims. (Cl. 279—51)

The present invention relates to automatic gripping means for machine tools and the like.

More particularly, the present invention relates to chucks of the collet type which are axially movable in a spindle between gripping and releasing positions, these collets usually having slotted outer ends providing springy tongues, and these tongues having a beveled outer surface engaging a conical surface on the spindle to produce the gripping and releasing action of the collet upon axial movement thereof in the spindle.

In most machine tools, and in particular on portable machine toools, such as portable grinding machines, for example, such collets are axially moving through manually operable means which require the spindle to be held stationary by pin members or the like which extend through transverse openings of the outer casing. Such devices are extremely inconvenient and do not always produce the desired gripping action.

One of the objects of the present invention is to overcome the above disadvantage by providing a means for operating the collet in a fully automatic manner.

A further object of the present invention is to provide a means actuated by the centrifugal force of a rotating spindle for operating a collet.

Another object of the present invention is to provide a means for holding an article in a collet before the article is gripped by the collet.

A still further object of the present invention is to provide an apparatus capable of accomplishing all of the above objects while at the same time being made of few, simply and ruggedly constructed parts which are very reliable in operation.

With the above objects in view the present invention mainly consists of a gripping apparatus associated with a hollow rotatable machine spindle. This gripping apparatus includes a gripping member, such as a collet, mounted in the spindle for axial movement therealong between a gripping and a releasing position. A moving member is located in the spindle for automatic movement, by centrifugal force produced by the rotating spindle, between a rest position, when the spindle is stationary, and an operating position, when the spindle rotates, this moving member being operatively connected to the gripping member for moving the same from the releasing to the gripping position thereof upon movement of the moving member from the rest to the operating position thereof, so that an article placed within the gripping member will be automatically gripped upon rotation of said spindle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
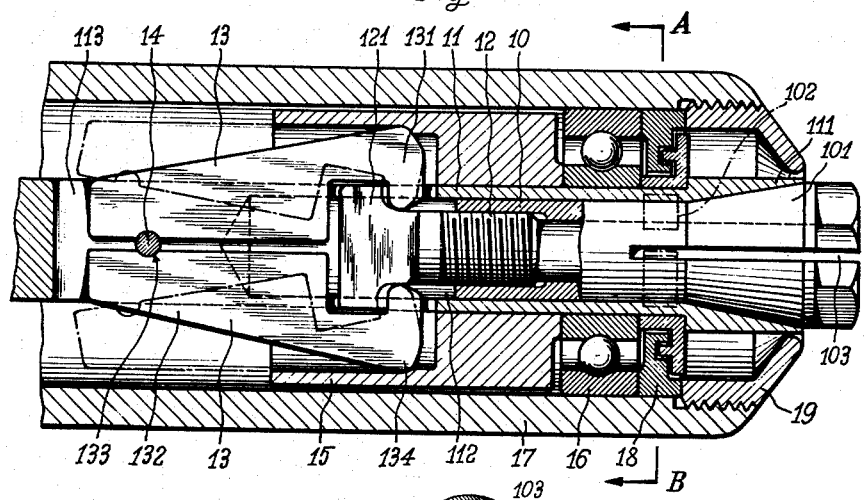
Fig. 1 is a fragmentary side sectional view of a machine part having the structure of the invention associated therewith.

Referring now to the drawings, the apparatus illustrated in Fig. 1 includes a collet 10 which, at its right hand end, is formed with inwardly extending slots to provide tongues 101 having outer conical surfaces engaging a corresponding conical seat 111 of the rotating spindle 11. The collet 10 is slidably mounted in a hollow free end portion 112 of the spindle 11. The inner end of the collet 10 is threadedly connected to a bolt 12 whose head 121 is formed as a flat piece guided in a slot 113 passing transversely through the spindle 11.

In this slot 113 are loosely located a pair of flat, hook-shaped members 13 having shorter legs 131 which engage the shoulder of the flat screw head 121, and, in their rest position, the longer legs 132 of the members 13 have their inner edges parallel to the spindle axis, as illustrated in Fig. 1. In order to prevent these longer legs 132 from crossing over the spindle axis and interfering with each other, a transverse bolt 14 is mounted within the spindle, and the longer legs 132 are provided with cut-outs 133 engaging the bolt 114 when the spindle is stationary. The members 13 are provided with outer curved edge portions 134 at the junction between the legs 131 and 132 thereof, and these curved edge portions 134 engage an inner part of a member 15 connected to the spindle 11 for rotation therewith in such a way that the members 13 can turn in their own plane while bearing against an annular surface portion on the inside of this member 15, as illustrated in Fig. 1.

The spindle 11 is mounted rotatably in a casing 17 by means of the roller bearing 16. This bearing 16 is maintained in a predetermined axial position by the sealing means 18 against which a nut 19 bears, this nut 19 being threadedly connected to the hollow casing 17, as illustrated at the right-hand part of Fig. 1.

In Fig. 1 the moving members 13 are shown, in solid lines, in their rest position. When an article such as the shank of a tool, for example, is placed within the collet 10 and the spindle is set into rotation, then when a sufficient speed of rotation has been attained the longer and heavier legs 132 of the members 13 move, by centrifugal force, out of the slot 113 of the spindle 11. These members 13 turn about the curved edges 134 thereof. This causes a movement of the shorter legs 131 inwardly into the casing 17 and, by engagement with the shoulders of bolt head 121, legs 131 move the collet 10 inwardly into the spindle 11. Thus, the conical seat 111 presses against the tongues 101 to cause the latter to tightly grip an article located within collet 10. The annular member 15 is formed to simultaneously serve as a stop for limiting the turning of the moving members 13 under centrifugal force, these members 13 being movable to the dotted line position illustrated in Fig. 1.

Since the operation of the apparatus is dependent upon a minimum speed of rotation, the above described apparatus is capable of acting as a safety device against overloads, because when the load increases the speed of rotation decreases, and when this speed of rotation becomes too small to provide the automatic gripping force by centrifugal action, the tool or the like located within the collet becomes free and can then turn within the opening of the collet.

Figure 2:
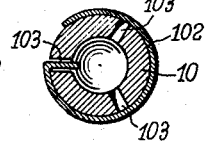
Fig. 2 is a sectional view of a part of the structure of Fig. 1 taken along line A—B of Fig. 1 in the direction of the arrows.

In order to prevent an article placed within the collet 10 from falling out of the same when the spindle is stationary, there is provided, in accordance with the present invention, a device for holding such an article within the stationary collet. One example of such a device is shown in Fig. 2 where it is seen that a springy arcuate member 102 passes about and engages the collet 10 and is provided with a bent free end portion extending radially through one of the slots 103 of the collet 10 into the interior of the inner space of the collet 10. Thus, when an article is placed within the collet 10, this article engages the yieldable free end of member 102 located in the interior of the collet 10 so as to be yieldably pushed by this free end of member 102 against the inner surface of the collet 10 and thereby frictionally held within the latter with a light pressure.

Figure 3:
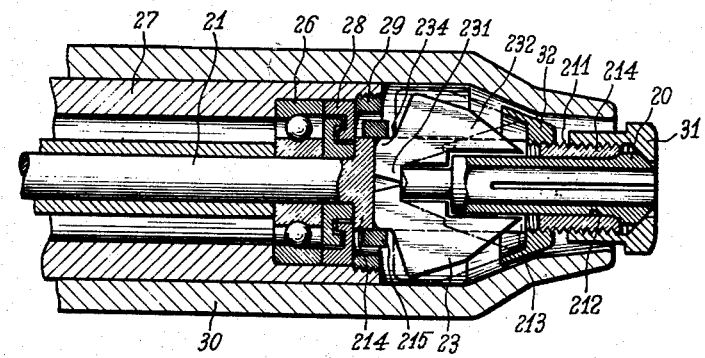
Fig. 3 is a side sectional view, similar to Fig. 1, of a different embodiment of the present invention.

In the example of Fig. 3, there is provided a bearing support 27 in which a spindle 21 is located and rotatably mounted by the ball bearing 26. This ball bearing is held in position by sealing ring 28 and outwardly threaded collar 29 which threadedly engages an inner portion of the bearing support 27. This bearing support 27 is located within the casing 30. The outer enlarged end 214 of the spindle 21 is formed with a transverse slot 213 and is threaded at its outer end 211. To this threaded part 211 of spindle 21 there is connected a member 31 provided with an inner conical surface for engaging the tongues of collet 20. This collet is set into the central bore 212 of spindle 21 and is moved to the right, as viewed in Fig. 3, into its gripping position by engagement of its tongues with the inner conical surface of member 31. This movement of collet 20 into its gripping position is accomplished through the medium of hook-shaped members 23 which are flat and located within the slot 213, these members 23 having shorter legs 231 located against the rear end of collet 20. In the rest position of the apparatus, the members 23 assume the position shown in solid lines in Fig. 3, where their longer legs 232 extend in a direction substantially parallel to the spindle axis. Upon rotation of the spindle, the members 23 turn to the dotted line position illustrated in Fig. 3, the members 23 turning about their edge portions 234 which rest against a ring-shaped part 215 fixed on the enlarged spindle part 214. In order to limit the outward movement of legs 232 of members 23, the spindle part 214 has fixedly mounted thereon an additional ring-shaped member 32 which extends over the free ends of legs 232 so that the latter engage member 32 when moving away from the spindle axis by centrifugal force upon rotation of the spindle.

Upon turning of the hook-shaped members 23 under centrifugal force as described above, their shorter legs 231 push against the free inner end of the collet 20 and move the latter to the right, as viewed in Fig. 3, so that a gripping action is automatically provided.

It should be noted that with the above described structure it is unnecessary to provide in member 17 or 30 a hole adapted to receive a locking pin for holding the spindle stationary, e. g., while tools are being gripped or released. Since no interior locking mechanism is required in the structure according to the invention the member 17 or 30 may be of a more compact shape as compared with corresponding parts in known devices, as it is clearly evident from the right-hand portions of Figs. 1 and 3. Thus, when a small-size grinding wheel is attached to an apparatus, such as that of Fig. 1 or 3, it will be possible to hold the device according to the invention in such a manner that the angle between its axis and the surface to be ground is extremely small, whereby the grinding action is materially improved. Expressed in a different manner, while grinding with a small-size grinding wheel may only be achieved with a conventional device when the latter is held with its axis at a considerable angle to the surface to be ground— an operation which has evidently decided drawbacks—this is not necessary when grinding with a device according to the invention where the small diameter of the structure of practically the same order—at least at its end portion—as the grinding wheel allows of applying the wheel with its axis almost parallel to the surface to be ground.

It will be understood that each of the elements described above, or two or more together, may also find a useful application in other types of automatic gripping means for machine tools and the like, differing from the types described above.

While the invention has been illustrated and described as embodied in centrifugal automatic gripping means for machine tools and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool or the like, in combination, a spindle adapted to rotate, having a hollow end portion and being formed with a radial slot communicating with the interior of the hollow end portion of said spindle; a collet mounted in said hollow end portion of said spindle for axial movement between an expanded position, where articles may be removed from and placed into the collet, and a contracted position gripping an article in the collet; an actuating member fixed to said collet and located within said spindle, so that said collet will move axially in said spindle upon axial movement of said actuating member; a moving member located in said slot for free turning movement about an axis perpendicular to the spindle axis, said moving member having a first portion engaging said actuating member, for moving the same and said collet therewith, and a weight portion freely mounted in said slot for movement by centrifugal force substantially radially away from the spindle axis upon rotation of said spindle, said movement of said weight portion moving said engaging portion to thereby move said actuating member and collet therewith, so that said collet automatically grips an article located therein upon rotation of said spindle; and a tubular housing located about said spindle and collet and completely enclosing said actuating member and said moving member.

2. In a machine tool or the like as defined in claim 1, stop means located in said housing on said spindle adjacent to said moving member for limiting the turning movement of the same upon rotation of the spindle.

3. In a machine tool or the like as defined in claim 1, a springy member mounted on said collet and having a free end portion extending into the interior of the latter so that said free end portion of said springy member is yieldably movable outwardly of the interior of the collet whereby an article placed in the collet while the latter is stationary will be frictionally engaged by said free end portion of said springy member to be maintained in the stationary collet.

4. In a machine tool or the like as defined in claim 3, said collet being formed with a plurality of radial slots and said springy member having an arcuate portion located about and engaging said collet over said slots thereof and said free end portion of said springy member being bent from said arcuate portion and extending through one of said radial collet slots into the interior of said collet.

5. In a machine tool or the like, in combination, a spindle turnably mounted for rotation about its axis and having a hollow end portion, said spindle being formed with a radial slot communicating with the interior of said hollow end portion of said spindle; a collet slidably mounted in said hollow end portion for axial movement between gripping and releasing positions, said collet having an outer end portion adapted to grip an article placed in said collet and an inner end portion located within said hollow end portion of said spindle; a substantially hook-shaped moving member located within said slot of said spindle for turning movement about an axis perpendicular to the spindle axis and in a plane including the latter, said moving member having one leg engaging said inner end portion of said collet and another leg freely movable in said slot, so that when the spindle is rotated said other leg of said moving member will move by centrifugal force substantially radially away from the spindle axis to cause said one leg of said moving member to move said collet into the gripping position thereof.

6. In a machine tool or the like, as defined in claim 5, said other leg of said moving member being heavier than said one leg thereof.

7. In a machine tool or the like, as defined in claim 5, said other of said moving member being longer than said one leg thereof.

8. In a machine tool or the like, in combination, a rotatable spindle having a hollow free end portion and being formed with a radial slot communicating with the interior of said hollow spindle end portion and having a shoulder facing in a direction away from the outer extremity of said free end portion of said spindle; a collet slidably mounted in said hollow free end portion of said spindle for movement outwardly of said spindle into a releasing position and inwardly into said spindle to a gripping position; a rigid member fixed to the inner end of said collet within said spindle and having a shoulder facing said outer extremity of said spindle; and a substantially hook-shaped moving member having a pair of legs forming a curved portion on said moving member, the latter being located in said slot with said curved portion of said moving member bearing against said shoulder of said slot, one of said legs of said moving member engaging said shoulder of said rigid member so that upon rotation of the spindle the other of said legs of said moving member moves in a substantially radial direction away from the spindle axis to cause said moving member to turn on said slot shoulder about the curved portion of said moving member and to thereby cause said one leg of said moving member engaging said shoulder of said rigid member to move said rigid member and collet therewith inwardly into said hollow free end portion of said spindle so as to automatically cause said collet to grip an article located therein.

9. In a machine tool or the like, in combination, a rotatable spindle having a hollow, free end portion and being formed with a radial slot communicating with the interior of the hollow spindle end portion and having a shoulder facing toward the outer extremity of said free end portion of said spindle; a collet slidably mounted in said hollow free end portion of said spindle for movement outwardly of said spindle into a gripping position and inwardly into said spindle to a releasing position, said collet having a free inner end located within said hollow spindle end portion; and a substantially hook-shaped moving member having a pair of legs forming a curved portion on said moving member, the latter being located in said slot with said curved portion of said moving member bearing against said shoulder of said slot, one of said legs of said moving member engaging said free inner end of said collet so that upon rotation of the spindle the other of said legs of said moving member moves by centrifugal force in a substantially radial direction away from the spindle axis to cause said moving member to turn on said slot shoulder about the curved portion of said moving member and to thereby cause said one leg of said moving member engaging said free inner end of said collet to move the latter outwardly of said spindle so as to automatically cause said collet to grip an article located therein.

10. In a machine tool, in combination, a rotatable spindle having a hollow free end portion; collet means slidably mounted on said spindle end portion for axial movement between gripping and releasing positions; and a pair of moving members symmetrically mounted in said spindle end portion for free turning movement about parallel axes, respectively, perpendicular to the spindle axis, each of said moving members having one leg engaging said collet means and another free leg movable by centrifugal force in a substantially radial direction away from the spindle axis upon rotation of the latter to cause said one leg thereof to engage said collet means and move the same into the gripping position thereof.

11. In a machine tool as defined in claim 10, said other legs of said moving members being substantially parallel to each other and to the spindle axis when the latter is stationary.

12. In a machine tool as defined in claim 11, stop means located on said spindle opposite said other legs of said moving members to limit the outward movement thereof upon rotation of said spindle.

13. In a machine tool as defined in claim 12, limiting means located in said spindle between said other legs of said moving members for limiting the movement of said other legs toward the spindle axis when said spindle is stationary.

14. In a machine tool, in combination, an elongated spindle adapted to rotate about its axis, said spindle having a hollow free end portion and being formed with a radial slot communicating with the interior of said hollow end portion of said spindle; a collet mounted in said hollow end portion of said spindle for movement toward one end of said spindle into an expanded position, where articles may be removed from and placed into the collet, and toward an opposite end of said spindle into a contracted position gripping an article in the collet, an actuating member fixed to said collet, so that the latter moves upon movement of said actuating member, and having a face directed toward said one end of said spindle; a member fixed to said spindle for rotation therewith and having a curved shoulder located opposite said slot and being directed toward said opposite end of said spindle; and a flat, substantially hook-shaped moving member freely located at least partly within said slot, having one leg engaging said face of said spindle and a second leg larger than said one leg and extending from said one leg toward said opposite end of said spindle, said member being provided at the junction between said legs with a curved portion located against said curved shoulder so that said curved portion and said shoulder cooperate to form a pivot axis about which said moving member turns by centrifugal force, upon rotation of said spindle, to automatically move said collet toward the opposite end of said spindle into a gripping position.

References Cited in the file of this patent

UNITED STATES PATENTS

| Number | Name | Date |
|--------|------|------|
| 594,077 | Gauthier | Nov. 23, 1897 |
| 1,990,525 | Chancellor | Feb. 12, 1935 |

FOREIGN PATENTS

| Number | Country | Date |
|--------|---------|------|
| 481,505 | France | 1916 |